(12) United States Patent
Ashjaee et al.

(10) Patent No.: US 9,035,826 B2
(45) Date of Patent: May 19, 2015

(54) SATELLITE DIFFERENTIAL POSITIONING RECEIVER USING MULTIPLE BASE-ROVER ANTENNAS

(75) Inventors: Javad Ashjaee, Saratoga, CA (US); Lev B. Rapoport, Moscow (RU); Dmitry Kinkulkin, Moscow (RU); Vladimir Yefriemov, Moscow (RU)

(73) Assignee: Javad GNSS, Inc., San Jose, CA (US)

( * ) Notice: Subject to any disclaimer, the term of this patent is extended or adjusted under 35 U.S.C. 154(b) by 462 days.

(21) Appl. No.: 13/369,227

(22) Filed: Feb. 8, 2012

(65) Prior Publication Data
US 2012/0139784 A1 Jun. 7, 2012

Related U.S. Application Data

(62) Division of application No. 12/360,808, filed on Jan. 27, 2009, now Pat. No. 8,120,527.

(60) Provisional application No. 61/063,155, filed on Jan. 30, 2008.

(51) Int. Cl.
*G01S 19/44* (2010.01)
*G01S 19/14* (2010.01)
*G01S 19/54* (2010.01)

(52) U.S. Cl.
CPC .............. *G01S 19/44* (2013.01); *G01S 19/14* (2013.01); *G01S 19/54* (2013.01)

(58) Field of Classification Search
CPC ......... G01S 5/009; G01S 19/07; G01S 19/41; G01S 19/43

USPC ............ 342/357.24, 357.26, 357.27, 357.34, 342/357.44, 357.52; 701/468, 470
See application file for complete search history.

(56) References Cited

U.S. PATENT DOCUMENTS

| 5,838,279 A | 11/1998 | Duffett-Smith et al. |
| 6,950,059 B2 | 9/2005 | Rapoport et al. |
| 2008/0231506 A1 | 9/2008 | Stull et al. |

OTHER PUBLICATIONS

Bullock et al., "Integration of GPS with Other Sensors and Network Assistance (Chapter 9)", Understanding GPS : Principles and Applications, Second Edition, Editors Kaplan et al., 2006, 113 pages.
Salychev, Oleg S., "Coordinate Frames (Chapter 1)", Inertial Systems in Navigation and Geophysics, 1998, 18 Pages.
Salychev, Oleg S., "Coordinate Transformation (Chapter 2)", Inertial Systems in Navigation and Geophysics, 1998, 31 Pages.

(Continued)

*Primary Examiner* — Dao Phan
(74) *Attorney, Agent, or Firm* — Morrison & Foerster LLP

(57) ABSTRACT

A rover processor determines position of a rover based upon the interaction between multiple antennas located at the rover and multiple antennas located at a base. The rover antennas may include a rover master antenna having a phase center located at the centroid of the antennas patterns of at least two auxiliary rover antennas. The rover processor may determine the position of the rover master antenna based upon the relative positions of at least two rover antennas (e.g., the rover master antenna and at least one rover auxiliary antenna, or at least two rover auxiliary antennas) with respect to at least two antennas of a base transceiver.

29 Claims, 6 Drawing Sheets

(56) References Cited

OTHER PUBLICATIONS

Salychev, Oleg S., "Applied Estimation Theory (Chapter 8)", Inertial Systems in Navigation and Geophysics, 1998, 103 Pages.

Non Final Office Action received for U.S. Appl. No. 12/360,808, mailed on May 11, 2011, 6 pages.

Notice of Allowance received for U.S. Appl. No. 12/360,808, mailed on Oct. 19, 2011, 7 pages.

SATELLITE DIFFERENTIAL POSITIONING RECEIVER USING MULTIPLE BASE-ROVER ANTENNAS

CROSS REFERENCE TO RELATED APPLICATIONS

This application is a Divisional of U.S. patent application Ser. No. 12/360,808 (now U.S. Pat. No. 8,120,527), filed Jan. 27, 2009, which in turn claims the benefit to U.S. Provisional Patent Application No. 61/063,155, filed Jan. 30, 2008, the disclosures of both are hereby incorporated herein by reference in their entirety.

FIELD OF THE INVENTION

The present invention relates to data processing in satellite differential positioning systems employing multiple base and rover antennas.

BACKGROUND OF THE INVENTION

Navigation receivers that use global navigation satellite systems, such as GPS or GLONASS (hereinafter collectively referred to as "GNSS"), enable the highly accurate determination of the position of the receiver. The satellite signals comprise carrier harmonic signals that are modulated by pseudo-random binary codes and which, on the receive side, are used to measure the delay relative to a local reference clock. These delay measurements are used to determine the so-called pseudo-ranges between the receiver and the satellites. The pseudo-ranges are different from the true geometric ranges because the receiver's local clock is different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

The need to improve positioning accuracies has eventually led to the development of differential navigation/positioning. In this mode, the user position is determined relative to the antenna connected to a base receiver, assuming that the coordinates of the base are known with high accuracy. The base receiver transmits its measurements (or corrections to the full measurements) to a mobile navigation receiver (or rover). The rover receiver uses these corrections to refine its own measurements in the course of data processing. The rationale for this approach is that since the pseudo-range measurement errors on the base and rover sides are strongly correlated, using differential measurements will substantially improve positioning accuracy.

Usually, the base is static and located at a known position. However, in relative navigation mode, both the base and rover are moving. In this mode, the user is interested in determining the vector between the base and the rover. In other words, the user is interested in determining the continuously changing rover position relative to the continuously changing position of the base. For example, when one aircraft or space vehicle is approaching another for in-flight refueling or docking, a highly accurate determination of relative position is important, while the absolute position of each vehicle is generally not critical.

The position of the rover changes continuously in time, and thus should be referenced to a time scale. The determination of the position of a mobile rover with respect to a base receiver in real-time is commonly referred to as the "Real-Time Kinematic" or RTK algorithm. As the name "real time kinematic" implies, the rover receiver is capable of calculating/outputting its precise position as soon as raw data measurements and differential corrections are available at the rover (i.e., practically instantly). The RTK mode uses a data communication link (typically either a radio communication link or a GSM binary data communication link), through which all the necessary information is transmitted from the base to the rover.

Further improvement of the accuracy in differential navigation/positioning applications can be achieved by using both the carrier phase and pseudorange measurements from the satellites to which the receivers are locked. If one measures the carrier phase of the signal received from a satellite in the base receiver and compares it with the carrier phase of the same satellite measured in the rover receiver, one can obtain measurement accuracy to within a small fraction of the carrier's wavelength, or to within centimeter level.

The practical implementation of this scheme runs into the problem of ambiguities in the phase measurements. The ambiguities are caused by the fact that the receiver computes the carrier phase via integration of the Doppler shift frequency, in which ambiguities appear as integration constants. The difference in the phase delays of a carrier signal received by the base and rover receivers is measured accurately within a constant number of wavelengths. Moreover, the difference of these constants between satellites is an integer number specific to each pair of satellites. These integer numbers are referred to as "integer ambiguities." More precisely, one satellite is chosen as a "reference," and pairs are formed between all satellites (except the reference) and the reference satellite. Determination of integer ambiguities is part of precise RTK algorithm execution. The RTK algorithm determines the set of all such integer numbers for all the satellites pairs being tracked, one integer part for each pair of satellites. The RTK algorithm determines this set along with other unknown values, which include rover coordinates and variations in the time scales. Determination of integer ambiguities is also known as "integer ambiguity resolution".

Some existing GNSS satellite systems broadcast carriers in the L1 and L2 frequency bands. If the receiver processes the carrier signals in both of L1 and L2 bands, the number of satellite measurements channels increases correspondingly.

Two sets of raw measurements are measured by the base and rover receivers, respectively, and are used to determine the unknown state vector comprising three-dimensional position, clock shift, and the set of integer ambiguities. Each set of raw measurements includes the pseudo-range of each satellite to the receiver, and the full phase of each satellite carrier signal, the latter of which contains ambiguities. An observation vector is generated as the collection of the raw measurements for specific time instants known as "epochs".

The relationship between the state vector and the observation vector is defined by a well-known system of navigation equations. See Appendix 1 for a detailed description. Given an observation vector, the system of equations may be solved to find the state vector if the number of equations equals or exceeds the number of unknowns in the state vector. In the latter case, conventional statistical methods may be used to solve the system: the least-squares method, and variations of recursive estimation, including well known methods of Kalman filtering, $H_\infty$ filtering, or $l_1$ estimation, for example.

Practical real time implementations of methods for processing differential raw measurements may vary widely. The following sources of problems should be taken into account when assessing different approaches to real time processing:

Positioning Accuracy. This is the main objective in GNSS technology. Positioning accuracy is directly dependent on the accuracy of the raw measurements. The sources of errors affecting raw measurements can be divided into two groups. The first group roughly comprises spatially correlated errors. Differential navigation methods are aimed to compensate for those errors that simultaneously affect receivers located close to one another. The closer the distance between two antennas (the base and the rover), the better the compensation of common (correlated) errors. Well-known sources of such errors are ionospheric delays and ephemeris errors.

The second group of errors comprises spatially uncorrelated errors. Well known sources of this type of error are noise-like errors and multipath errors. Multipath errors are caused by reflection of the radio signal from surfaces located near the antenna. The antenna receives the direct signal running the shortest path from the satellite to the receiver, and also reflected signals following indirect paths. The combination of two (or more) signals at the antenna leads to the distortion of raw measurements. Multipath errors affect both pseudo-range and carrier phase measurements (see Appendix 1). The spatial correlation of multipath depends on the location of the reflection surface relative to the antenna. For surfaces generating reflections arriving at the upper side of the antenna, the carrier phase multipath happens to be substantially uncorrelated for antennas located only decimeters away. Owing to the uncorrelated nature of multipath errors, multiple antennas, connected to a multi-antenna receiver, can be used to improve the accuracy of raw measurements by averaging the measurements.

Availability of the position. Shading of signals coming from one or several satellites and tracked by the receiver may cause measurements to become unavailable. As a consequence, in conventional systems the receiver, working in either standalone or differential modes, can lose the ability to determine position. To remedy this defect one may try using multiple antennas, assuming that an obstacle shades not all antennas simultaneously. The position of the unknown shaded antenna may be derived from the known positions of other antennas of the receiver.

Speed of calculations. In developing positioning methods, one usually must find a compromise between the accuracy of the results and speed of calculations. It is desired to find an improved method to obtain accurate results for a given processing power.

SUMMARY OF THE INVENTION

Embodiments of the invention determine position of a rover receiver based upon the interaction between multiple antennas located at the rover and multiple antennas located at the base.

The rover antennas may be laid out in a spatially symmetric manner, or asymmetrically if the orientation of the rover antennas (e.g., with respect to the earth) is known. In the first case, the rover antennas may include a rover master antenna having a phase center located at the centroid of the antenna patterns of at least two auxiliary rover antennas. The rover master and auxiliary antennas may lie substantially in the same plane, e.g., within 1 mm of each other in the plane. Rover processing logic (e.g., a processor residing on the rover) may determine the position of the rover master antenna based upon the relative positions of at least two rover antennas (e.g., the rover master antenna and at least one rover auxiliary antenna, or at least two rover auxiliary antennas) with respect to at least two antennas of a base transceiver.

In the second case, an orientation unit may determine the orientation of the rover with respect to, for example, the ECEF coordinate system. In that case, the rover antennas may include at least two rover antennas, not necessarily laid out in a symmetric fashion. The rover processing logic may determine the position of the rover based upon the orientation and the position of the at least two rover antennas with respect to at least two antennas of a base transceiver.

The base includes the base transceiver and at least two base antennas. If the positions of the base antennas are known, then only two base antennas need to be used. If the base is moving (and even if the base antenna positions are not known a priori), then the base may include an orientation unit to determine the orientation of the base antennas (e.g., with respect to the ECEF reference frame). Given that the relative position of each base antenna to each other base antenna is usually known, the base processing logic may compute the positions of the base antennas (e.g., with respect to the ECEF frame) from the orientation and the relative positions of the base antennas.

If the positions of the base antennas are not known a priori and an orientation unit is not used, then the at least two base antennas may include a base master antenna and at least two base auxiliary antennas arranged in a spatially symmetric manner. Under this arrangement, the base processing logic may compute the position of the base master antenna.

In either case, the base transceiver may transmit to the rover either raw measurements (e.g., pseudorange and carrier phase) or corrections (e.g., pseudorange and carrier phase corrections) with respect to each navigational satellite (of at least four satellites). Because the base employs multiple antennas, base processing logic may average the corrections to enable the base transceiver to transmit to the rover receiver an average correction. In this manner, the multiple base antennas appear to the rover to act as one effective base antenna, resulting in one effective baseline between the base and each rover antenna. The rover processing logic measures its own position (e.g., pseudorange and carrier phase) with respect to the GNSS satellites, and uses the raw measurements or corrections from the base to correct its determination of rover position.

In addition to determining the position of the rover master antenna using the techniques above (for the spatially symmetric arrangement), the rover processing logic may also determine the master antenna position by simply averaging the positions of the rover auxiliary antennas determined using the above techniques. By comparing the averaged master antenna position to the estimated position determined by the above techniques, the rover processing logic provides a check on the accuracy of the master antenna position determined by embodiments of the invention herein. If the difference between the averaged position and the estimated positions exceed a predetermined threshold, then the rover processing logic may indicate to a user a decrease in expected accuracy, or reset its algorithm to start computing rover position from scratch (because the current algorithm may have accumulated anomalous errors).

DETAILED DESCRIPTION OF EMBODIMENTS OF THE INVENTION

In one embodiment, the present invention employs two multiple-antenna systems, one as base and the other as rover. Without loss of generality, this specification will primarily describe a base and a rover that each employ four-antenna assemblies.

Figure 1:
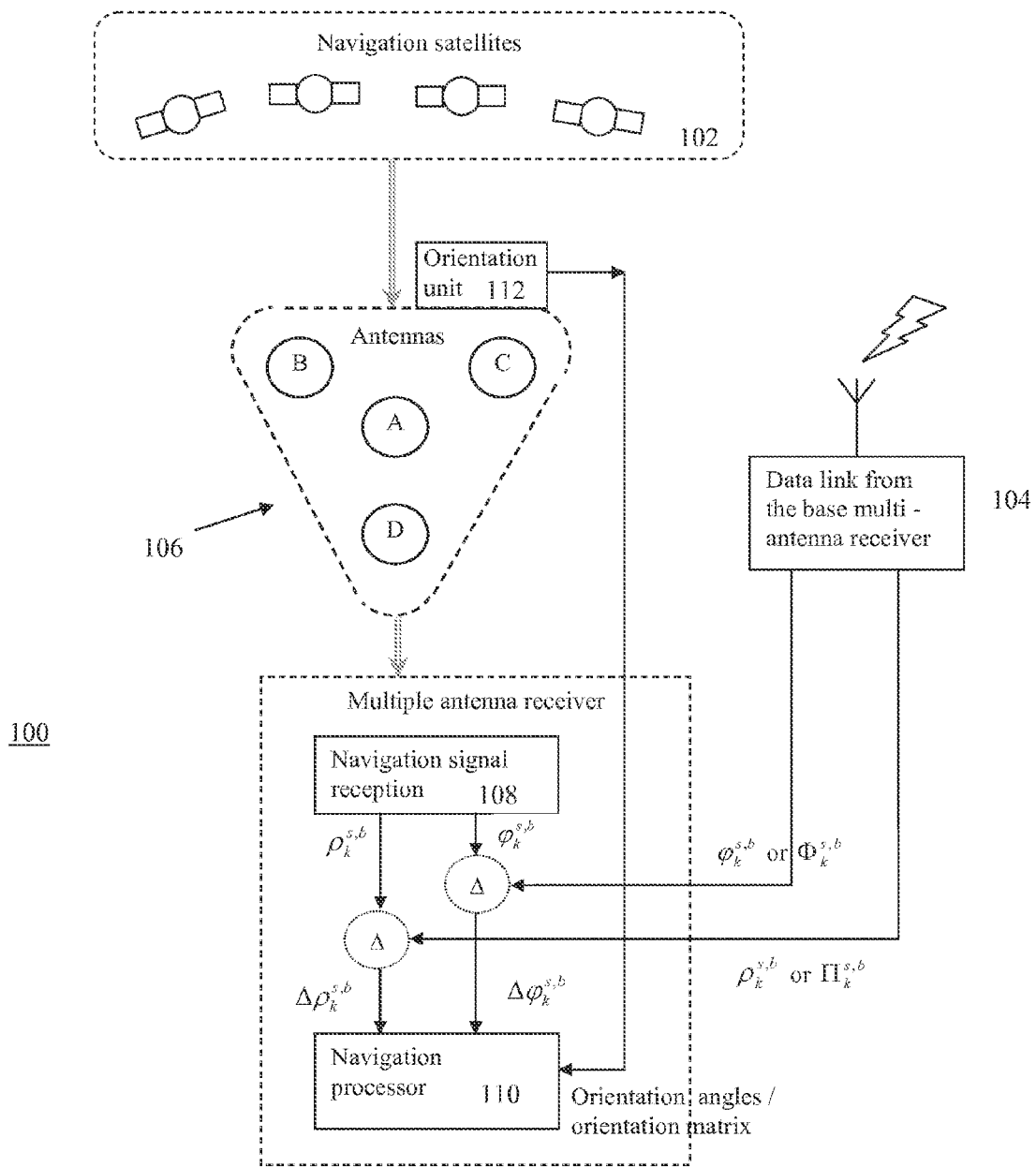
FIG. 1 illustrates a rover receiver according to embodiments of the invention.

FIG. 1 illustrates a rover receiver 100 according to embodiments of the invention in communication with navigation satellites 102 and a base transceiver (through a data link). As shown, the rover receiver 100 includes an antenna assembly 106 of four spatially symmetric antennas—master antenna A and auxiliary antennas B, C and D. A navigation signal receiver 108 receives satellite navigation signals through the antenna assembly to produce pseudorange and carrier phase measurements, which are provided to a navigation processor 110.

A rover-side data link 104 receives either raw pseudorange and carrier phase measurements or positional corrections from the base. The navigation processor 110 (i.e., rover processing logic) determines rover position using the computations described below in Appendices 3 and 4. In another embodiment in which the antenna system is not spatially symmetric, the processor employs an orientation of the rover antenna assembly (provided by a rover-side orientation unit 112) in its computations to determine rover position.

Figure 2:
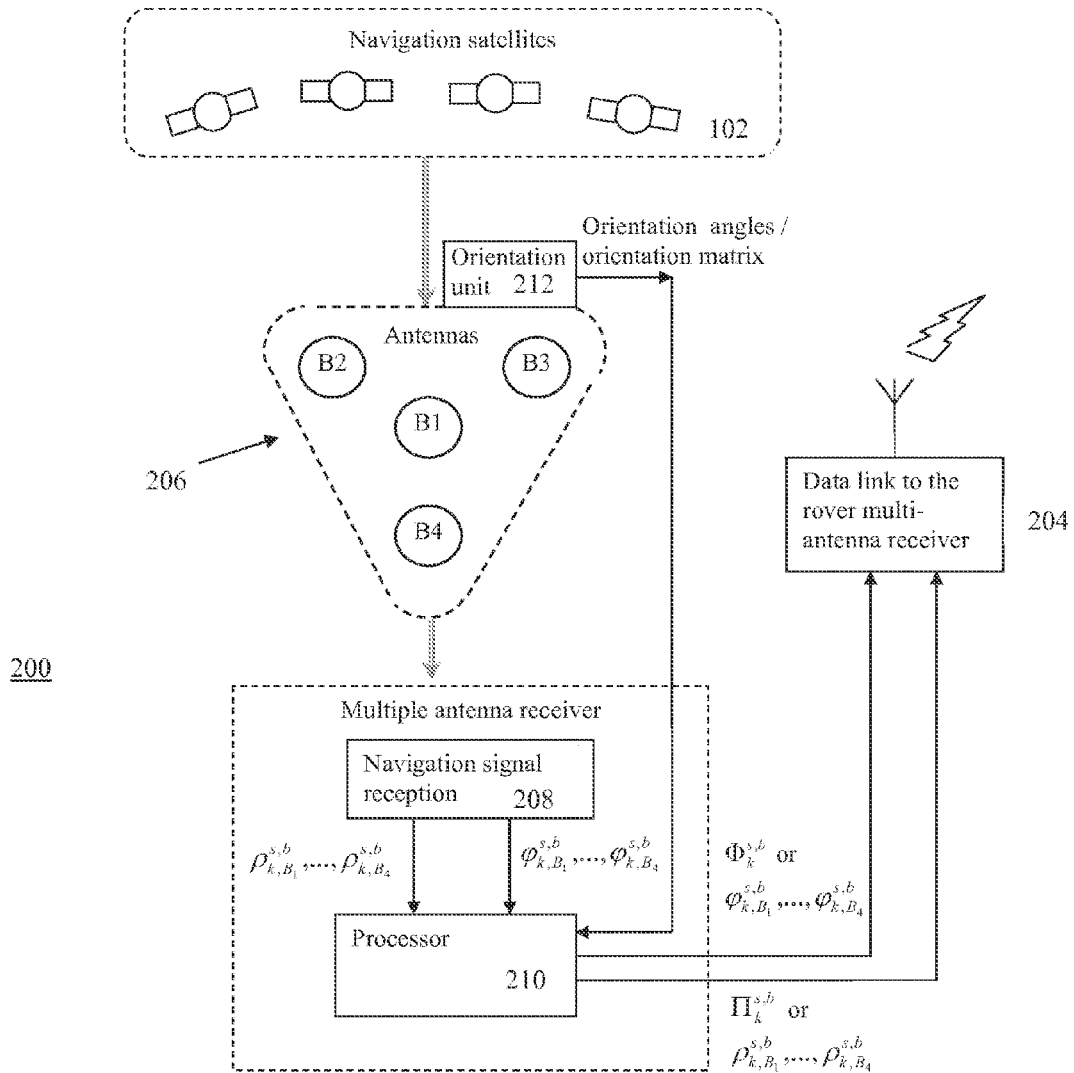
FIG. 2 illustrates a base transceiver according to embodiments of the invention.

FIG. 2 illustrates a base transceiver 200 of embodiments of the invention in communication with the navigation satellites 102 and the rover receiver (through a data link 204). The base transceiver includes an antenna assembly 206 of four spatially symmetric antennas, as shown. A navigation signal receiver 208 receives satellite navigation signals through the antenna assembly to produce pseudorange and carrier phase measurements for the multiple base antennas.

A base navigation processor 210 (i.e., base processing logic) provides pseudorange and carrier phase measurements or positional corrections to the base data link for transmission to the rover. If the base antennas system is spatially symmetric, the processor may determine the position of only one "master" antenna. In another embodiment in which the base antennas are not spatially symmetric, the processor determines the position of all base antennas. The processor performs calculations described in Appendix 5. If the base antennas are not spatially symmetric, the processor employs an orientation of the base antenna assembly (provided by a base-side orientation unit 212) in its computations.

In one embodiment, the antennas on the rover are arranged in a spatially symmetric manner with the antennas having the same antenna patterns. This makes it possible to reduce multipath through simple averaging. The position of the central antenna (which is denoted the "master" antenna) coincides with the arithmetic mean of the position of the three antennas located at the apexes, as shown in FIG. 1. In a more general case in which the physical antennas themselves are not actually arranged in a spatially symmetric manner but the phase center of the master antenna is placed to coincide with the centroid of the antenna patterns of the three auxiliary antennas, we will refer to this case as "spatially symmetric" as well. The use of spatial symmetry on the rover side is required only if the orientation of the rover antenna system is unknown.

Appendix 5 describes base data processing when spatial symmetry of the base antennas is not assumed. In an embodiment in which the bases are static, the precise position of every base is assumed to be known. If instead the base is moving (i.e., the system is in relative navigation mode), base processing logic may reduce residuals (corrections) to a master base point (arbitrarily selected point of the base) either by using spatial symmetry and simple averaging, or using an orientation unit and known separation vectors between the antennas on the base.

Using four antennas on the rover side leads to better "position availability." Even the position of a single antenna can be used to determine the position of the central point (position of the master antenna in a spatially symmetric arrangement) by using the orientation of the rover antenna system. The use of the orientation is explained in "Appendix_3" where the orthogonal matrix $Q_k$ of rotation of the body frame (that supports the four antennas) from the Earth-Centered Earth-Fixed Frame (ECEF) is introduced. The orientation matrix $Q_k$ is easily estimated for any time instant k when all four antennas are exposed to the open sky and all data is available. When the antenna system gradually moves under an obstacle, such as a tree, data availability will be degraded, but orientation (as represented by the orientation matrix $Q_k$) can be extrapolated ahead in time for some period of time, for example several seconds, while measurements under the obstacle are performed. Extrapolation can implemented with the use of a simple first or second order dynamic model and the Kalman filter, or other known recursive estimation schemes. Typical dynamic models include first or second order Gauss-Markov processes. They are reasonably accurate when the actual appropriate dynamic model is unknown, but one needs to extrapolate a time-varying quantity knowing only that the quantity is "more or less inertial." Using known between-antenna vectors (A–B), (A–C), (A–D) in the rover antenna system's body frame (accurately measured beforehand or known from the rover antenna system design drawing) and the matrix $Q_k$, the position of the master antenna A at the time instant k can be calculated as $A_k = B_k + Q_k(A-B)$ if the position of base antenna $B_k$ (for example) is available.

As mentioned above, an orientation unit (e.g., an inertial measurement unit (IMU)) may be employed in combination with the multi-antenna system. The orientation unit enables determination of the full orientation (the matrix matrix $Q_k$) and the rover position (e.g., master antenna position) even under partial or full shading conditions. Usually an IMU, for example, includes six low-cost inertial sensors—accelerometers and gyroscopes. The integration of GNSS with inertial measurements is well described in the literature. See O. Salychev, *Inertial Systems in Navigation and Geophysics*, and E. Kaplan, *Understanding GPS: Principles and Applications*, Artech House, Chapter 9 (second edition 2006), both incorporated by reference herein. Using integrated techniques enables extrapolation of the orientation when shading makes some of antennas unavailable. Using inertial measurements also makes it possible to extrapolate orientation for a longer time period than some other methods of extrapolation, such as first or second order dynamic modeling and Kalman filtering as described above.

Employing four antennas at the base and four antennas at the rover makes it possible to determine sixteen baselines. Sixteen baselines can be processed independently and can be used as an improved means to check for anomalous measurements. In one embodiment, the rover antennas A, B, C, D are arranged in a spatially symmetric manner, and orientation of the rover antennas is assumed to be unknown. On the base side, the positions of all four antennas E, F, G, H are known in this embodiment. The position of every rover antenna (e.g., master rover antenna and three auxiliary rover antennas) can be calculated using any one of the four base antennas. In other words, the position of the rover master antenna A (for example) can be estimated using baselines (A-E), (A-F), (A-G), (A-H) as $A^{(1)}=E+(A-E)$, $A^{(2)}=F+(A-F)$, $A^{(3)}=G+(A-G)$, $A^{(4)}=H+(A-H)$.

In the ideal case in which errors are absent, all four baseline vectors start at different base antennas and point to the same rover position A (A is, e.g., the master rover antenna position in the spatially symmetric case, or an arbitrary point representing rover position, especially in the asymmetric case.) In the real world, errors cause the baseline vectors to end at four points slightly different from the ideal point A. The multi-vector redundancy in this embodiment can be used as an additional check for consistency. The error in one baseline produces an outlier that is easy to detect and isolate when comparing $A^{(i)}$, i=1, 2, 3, 4 with the averaged position of the rover $A=\frac{1}{4}(A^{(1)}+A^{(2)}+A^{(3)}+A^{(4)})$ For example, if the position determined from one baseline compared to the average exceeds a predetermined threshold, the rover processor can treat that baseline as an anomaly. Moreover, after all four rover antenna positions A, B, C, D are estimated, the averaged position $\tilde{A}=\frac{1}{3}(B+C+D)$ may be compared with A to check for consistency. This additional check improves reliability. If this check fails, position A may be reported as an imprecise position.

Using four antennas at the rover side also makes it possible to reduce the quadruplicate set of raw measurements to measurements referred to the master antenna. That makes it possible to take advantage of redundancy when calculating the master antenna position. Better redundancy provides the ability to better check for outliers and cycle slips. Resolving ambiguity between antennas reduces the measurements to the same ambiguity level. The set of carrier phase measurements from four antennas can be considered as an extended (by a factor of 4) set of carrier phase measurements reduced to the middle (master) point. Resolving ambiguity between the middle point and the base solves the problem of location of the middle point. Details are provided in Appendices 3 and 4. After the quadruplicate set of measurements is generated, conventional real time processing methods may be used. This method of calculation optimizes the processor load when real time processing on the rover side, as only a single set of carrier phase ambiguity and ionosphere delays must be estimated.

Another aspect of the invention is the use of four antennas at the base side to generate a single set of measurements, as described in Appendix 5. A UHF radio or GSM link is used to transmit raw measurements from the base to the rover in real time. To decrease the throughput, one may want to place as much calculation on the base side as possible. The method of averaging of raw measurements from four antennas and calculation of a single set of RTCM corrections is described in Appendix 5. This method of calculation reduces the processor load when processing on the rover side in the real time, as part of the calculation is instead performed on the base side.

The antenna assembly may be supported by, for example, a pole having a distal end that touches the ground. The end of the pole is referred to as a "ground marker." The pole may rest at an angle that is not perpendicular to the ground, in which case the imaginary plane in which the antenna assembly lies may be tilted from the horizontal. One advantage of embodiments of the invention is that the ability to determine the full three dimensional orientation of a multi-antenna system makes it possible not to use any vertical leveling devices and procedures. The orientation of the antennas at the rover side enables determination of the ground marker position independently of orientation.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 3:
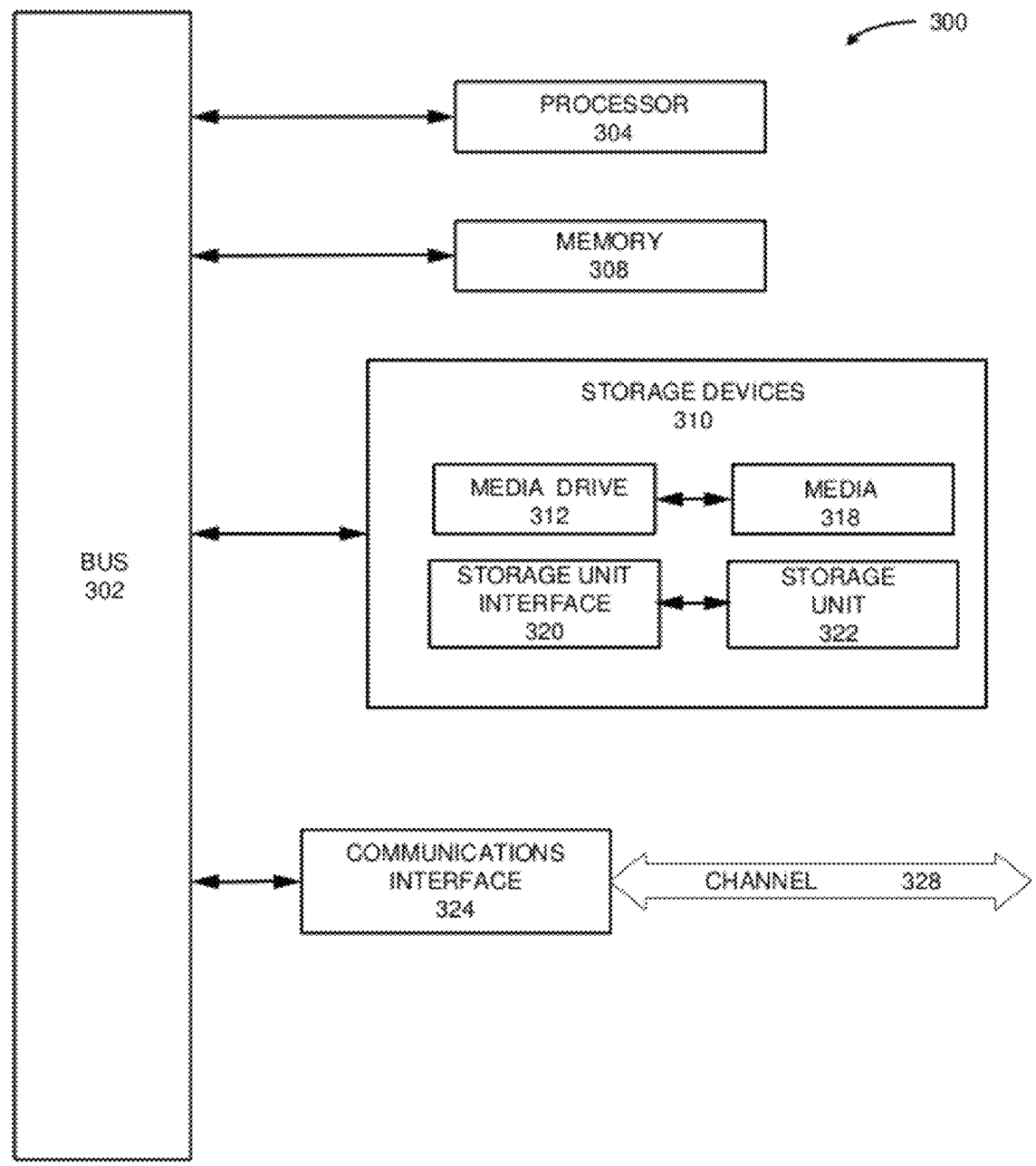
FIG. 3 illustrates a typical computing system that may be employed to implement processing functionality in embodiments of the invention.

FIG. 3 illustrates a typical computing system 300 that may be employed to implement processing functionality in embodiments of the invention. Computing systems of this type may be used to implement the rover processing logic and the base processing logic, for example. Those skilled in the relevant art will also recognize how to implement the invention using other computer systems or architectures. Computing system 300 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 300 can include one or more processors, such as a processor 304. Processor 304 can be implemented using a general or special purpose processing engine such as, for example, a microprocessor, microcontroller or other control logic. In this example, processor 304 is connected to a bus 302 or other communication medium.

Computing system 300 may also include a main memory 308, such as random access memory (RAM) or other dynamic memory, for storing information and instructions to be executed by processor 304. Main memory 308 also may be used for storing temporary variables or other intermediate information during execution of instructions to be executed by processor 304. Computing system 300 may likewise include a read only memory ("ROM") or other static storage device coupled to bus 302 for storing static information and instructions for processor 304.

The computing system 300 may also include information storage system 310, which may include, for example, a media drive 312 and a removable storage interface 320. The media drive 312 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 318, may include, for example, a hard disk, floppy disk, magnetic tape, optical disk, CD or DVD, or other fixed or removable medium that is read by and written to by media drive 314. As these examples illustrate, the storage media 318 may include a computer-readable storage medium having stored therein particular computer software or data.

In alternative embodiments, information storage system 310 may include other similar components for allowing computer programs or other instructions or data to be loaded into computing system 300. Such components may include, for example, a removable storage unit 322 and an interface 320, such as a program cartridge and cartridge interface, a removable memory (for example, a flash memory or other removable memory module) and memory slot, and other removable storage units 322 and interfaces 320 that allow software and data to be transferred from the removable storage unit 318 to computing system 300.

Computing system 300 can also include a communications interface 324. Communications interface 324 can be used to allow software and data to be transferred between computing system 300 and external devices. Examples of communications interface 324 can include a modem, a network interface (such as an Ethernet or other NIC card), a communications port (such as for example, a USB port), a PCMCIA slot and card, etc. Software and data transferred via communications interface 324 are in the form of signals which can be electronic, electromagnetic, optical or other signals capable of being received by communications interface 324. These signals are provided to communications interface 324 via a channel 328. This channel 328 may carry signals and may be implemented using a wireless medium, wire or cable, fiber optics, or other communications medium Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 308, storage device 318, or storage unit 322. These and other forms of computer-readable media may be involved in storing one or more instructions for use by processor 304, to cause the processor to perform specified operations. Such instructions, generally referred to as, e.g., "computer program code" (which may be grouped in the form of computer programs or other groupings), when executed, enable the computing system 300 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 300 using, for example, removable storage drive 314, drive 312 or communications interface 324. The control logic (in this example, software instructions or computer program code), when executed by the processor 304, causes the processor 304 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

APPENDIX 1

Raw Measurement Structure

Let:
subscript $k$ denote the epoch number;
superscript $s$ denote the satellite number;
second superscript $1$ or $2$ denote the carrier frequency band (currently L1 or L2 respectively);
$\lambda^{s,b}$ be the carrier frequency wave length for the satellite s (GLONASS satellite transmit at different frequencies within the same band, whereas GPS employs only one frequency.) and the frequency band b;
$R_k^s$ be the calculated range between the satellite antenna phase center position at the time instant of emission and the receiver antenna phase center at the time instant of receiving including the clock shift (sometimes $R^s$ is referenced to as a pseudo-range);
$\rho_k^{s,b}$ be the pseudo-range measurements;
$\phi_k^{s,b}$ be the carrier phase measurement;
$I_k^s$ be the ionosphere delay as it affects the pseudo-range measurement at the frequency band L1;
$N^{s,b}$ be the carrier phase ambiguity;
$\epsilon_k^{s,b}$, $\xi_k^{s,b}$ be the noise affecting pseudo-range and carrier phase measurements respectively;
$M_k^{s,b}$ be the multipath error as it affects the pseudo-range measurements;
$m_k^{s,b}$ be the multipath error as it affects the pseudo-range measurements;
Taking into account notations defined above we now present a fundamental set of equations:

$$\rho_k^{s,1} = R_k^s + I_k^s + M_k^{s,1} + \varepsilon_k^{s,1}, \qquad (A1.1)$$

$$\rho_k^{s,2} = R_k^s + \left(\frac{\lambda^{s,2}}{\lambda^{s,1}}\right)^2 I_k^s + M_k^{s,2} + \varepsilon_k^{s,2},$$

$$\varphi_k^{s,1} = \frac{1}{\lambda^{s,1}} R_k^s - \frac{1}{\lambda^{s,1}} I_k^s + N^{s,1} + m_k^{s,1} + \xi_k^{s,1},$$

$$\varphi_k^{s,2} = \frac{1}{\lambda^{s,2}} R_k^s - \frac{\lambda^{s,2}}{(\lambda^{s,1})^2} I_k^s + N^{s,2} + m_k^{s,2} + \xi_k^{s,2}.$$

Let also:
capital letters A, B, C, D or $A_i$, i=1, 2, 3, 4, denote receiver antennas located at the rover side; E, F, G, H or $B_i$, i=1, 2, 3, 4, denote receiver antennas located at the base side.

the symbol $\Delta_{A,B}$ denote the single difference or difference taken between quantities associated with the antennas A and B; for example $\Delta_{A,B}\phi_k^{s,b}$ means "carrier phase measurement with respect to the antenna A measured at the time instant k for the satellite s at the frequency band b minus the same quantity measured with respect to the antenna B"

Using single difference notation the set of equations (A1.1) can be rewritten for any pair of antennas. For antennas closely located with respect to each other, like antennas located at the rover side, the first difference of ionosphere delay can be neglected, and the set of equations (A1.1) can be rewritten as $$\Delta_{A,B}\rho_k^{s,1} = \Delta_{A,B}R_k^s + \Delta_{A,B}M_k^{s,1} + \Delta_{A,B}\varepsilon_k^{s,1}, \quad (A1.2)$$

$$\Delta_{A,B}\rho_k^{s,2} = \Delta_{A,B}R_k^s + \Delta_{A,B}M_k^{s,2} + \Delta_{A,B}\varepsilon_k^{s,2},$$

$$\Delta_{A,B}\varphi_k^{s,1} = \frac{1}{\lambda^{s,1}}\Delta_{A,B}R_k^s + \Delta_{A,B}N^{s,1} + \Delta_{A,B}m_k^{s,1} + \Delta_{A,B}\xi_k^{s,1},$$

$$\Delta_{A,B}\varphi_k^{s,2} = \frac{1}{\lambda^{s,2}}\Delta_{A,B}R_k^s + \Delta_{A,B}N^{s,2} + \Delta_{A,B}m_k^{s,2} + \Delta_{A,B}\xi_k^{s,2}.$$

In this Appendix we have derived a fundamental set of first difference measurement equations, which are employed by the precise RTK algorithm.

APPENDIX 2

First Difference Closed Loop Conditions

Figure 4:
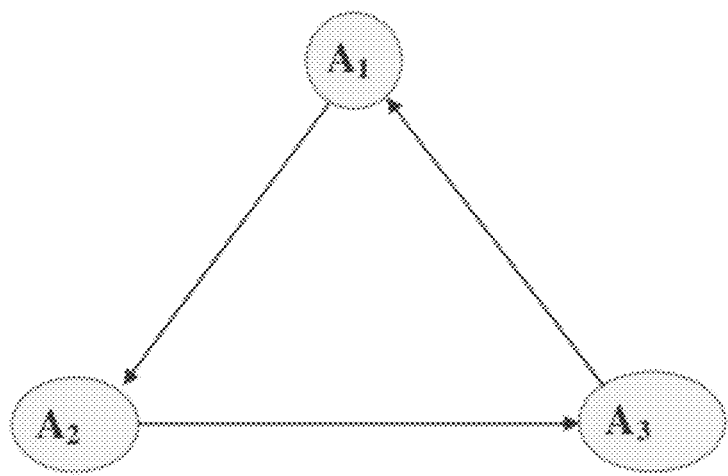
FIG. 4 illustrates relationships among three antennas arranged in a triangular configuration.

For any of three antennas shown in the FIG. 4 the following relationships hold $$\Delta_{A_1,A_2}X + \Delta_{A_2,A_3}X + \Delta_{A_3,A_1}X = 0$$

for every quantity X. For example, carrier phase ambiguity must fit the condition $$\Delta_{A_1,A_2}N^{s,b} + \Delta_{A_2,A_3}N^{s,b} + \Delta_{A_3,A_1}N^{s,b} = 0$$

for every satellite s and carrier phase band b.

Figure 5:
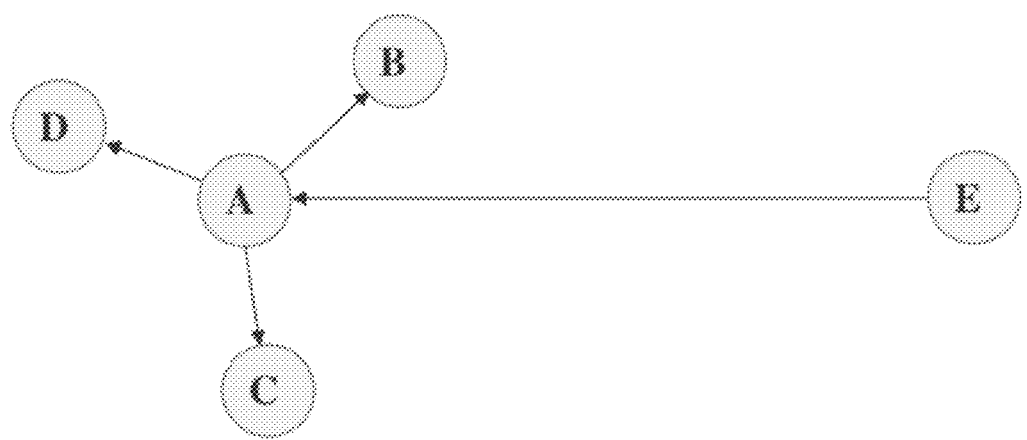
FIG. 5 illustrates four rover antennas communicating with one base antenna.

Now consider relationships between first difference carrier phase ambiguity for the case of four antennas located at the rover side, and a single antenna located at the base side, as shown in FIG. 5.

Consider $\Delta_{B,E}N^{s,b}$. Taking into account relationships $\Delta_{B,E}N^{s,b} = -\Delta_{E,B}N^{s,b}$ and $$\Delta_{E,B}N^{s,b} = -\Delta_{A,E}N^{s,b} = \Delta_{B,A}N^{s,b} = \Delta_{A,E}N^{s,b} = 0$$

Following from (A2.2), the first difference carrier phase ambiguity $\Delta_{B,E}N^{s,b}$ can be rewritten as $$\Delta_{B,E}N^{s,b} = -\Delta_{E,B}N^{s,b} = \Delta_{A,E}N^{s,b} + \Delta_{B,A}N^{s,b}$$

In the same manner, consider relationships for $\Delta_{D,E}N^{s,b}$ and $\Delta_{C,E}N^{s,b}$, which results in:

$$\Delta_{B,E}N^{s,b} = \Delta_{A,E}N^{s,b} + \Delta_{B,A}N^{s,b}$$

$$\Delta_{C,E}N^{s,b} = \Delta_{A,E}N^{s,b} + \Delta_{C,A}N^{s,b}$$

$$\Delta_{D,E}N^{s,b} = \Delta_{A,E}N^{s,b} + \Delta_{D,A}N^{s,b} \quad (A2.3)$$

The relationships (A2.3) associate the first difference carrier phase ambiguity in measurements for three baseline vectors (B, E), (C, E), (D, E) with the first difference carrier phase ambiguity of the "master" baseline vector (A, E) and "auxiliary internal" baseline vectors (B, A), (C, A), (D, A). The carrier phase ambiguity for "auxiliary internal" baselines (B, A), (C, A), (D, A) are much easier to resolve than ambiguity for "external" baselines (B, E), (C, E), (D, E) taking into account fixed mutual distances between antennas A, B, C, D, located on the rover side. Assuming that the ambiguities $\Delta_{B,A}N^{s,b}, \Delta_{C,A}N^{s,b}, \Delta_{D,A}N^{s,b}$ are already resolved and known, we rewrite the set of first difference measurements for baselines (A, E), (B, E), (C, E), (D, E). Below we also take into account that $$\Delta_{B,E}I_k^{s,b} = \Delta_{A,E}I_k^{s,b} + \Delta_{B,A}I_k^{s,b} \approx \Delta_{A,E}I_k^{s,b},$$

$$\Delta_{C,E}I_k^{s,b} = \Delta_{A,E}I_k^{s,b} + \Delta_{C,A}I_k^{s,b} \approx \Delta_{A,E}I_k^{s,b},$$

$$\Delta_{D,E}I_k^{s,b} = \Delta_{A,E}I_k^{s,b} + \Delta_{D,A}I_k^{s,b} \approx \Delta_{A,E}I_k^{s,b}.$$

Further:

$$\begin{cases} \Delta_{A,E}\rho_k^{s,1} = \Delta_{A,E}R_k^s + \Delta_{A,E}I_k^s + \Delta_{A,E}M_k^{s,1} + \Delta_{A,E}\varepsilon_k^{s,1}, \\ \Delta_{A,E}\rho_k^{s,2} = \Delta_{A,E}R_k^s + \left(\frac{\lambda^{s,2}}{\lambda^{s,1}}\right)^2 \Delta_{A,E}I_k^s + \Delta_{A,E}M_k^{s,2} + \\ \qquad \Delta_{A,E}\varepsilon_k^{s,2}, \\ \Delta_{A,E}\varphi_k^{s,1} = \frac{1}{\lambda^{s,1}}\Delta_{A,E}R_k^s - \frac{1}{\lambda^{s,1}}\Delta_{A,E}I_k^s + \Delta_{A,E}N^{s,1} + \\ \qquad \Delta_{A,E}m_k^{s,1} + \Delta_{A,E}\xi_k^{s,1}, \\ \Delta_{A,E}\varphi_k^{s,2} = \frac{1}{\lambda^{s,2}}\Delta_{A,E}R_k^s - \frac{\lambda^{s,2}}{(\lambda^{s,1})^2}\Delta_{A,E}I_k^s + \Delta_{A,E}N^{s,2} + \\ \qquad \Delta_{A,E}m_k^{s,2} + \Delta_{A,E}\xi_k^{s,2}. \end{cases} \quad (A2.4)$$

$$\begin{cases} \Delta_{B,E}\rho_k^{s,1} = \Delta_{B,E}R_k^s + \Delta_{A,E}I_k^s + \Delta_{B,E}M_k^{s,1} + \Delta_{B,E}\varepsilon_k^{s,1}, \\ \Delta_{B,E}\rho_k^{s,2} = \Delta_{B,E}R_k^s + \left(\frac{\lambda^{s,2}}{\lambda^{s,1}}\right)^2 \Delta_{A,E}I_k^s + \Delta_{B,E}M_k^{s,2} + \\ \qquad \Delta_{B,E}\varepsilon_k^{s,2}, \\ \Delta_{B,E}\varphi_k^{s,1} = \frac{1}{\lambda^{s,1}}\Delta_{B,E}R_k^s - \frac{1}{\lambda^{s,1}}\Delta_{A,E}I_k^s + \Delta_{A,E}N^{s,1} + \\ \qquad \Delta_{B,A}N^{s,1} + \Delta_{B,E}m_k^{s,1} + \Delta_{B,E}\xi_k^{s,1}, \\ \Delta_{B,E}\varphi_k^{s,2} = \frac{1}{\lambda^{s,2}}\Delta_{B,E}R_k^s - \frac{\lambda^{s,2}}{(\lambda^{s,1})^2}\Delta_{A,E}I_k^s + \Delta_{A,E}N^{s,2} + \\ \qquad \Delta_{B,A}N^{s,2} + \Delta_{B,E}m_k^{s,2} + \Delta_{B,E}\xi_k^{s,2}. \end{cases} \quad (A2.5)$$

$$\begin{cases} \Delta_{C,E}\rho_k^{s,1} = \Delta_{C,E}R_k^s + \Delta_{A,E}I_k^s + \Delta_{C,E}M_k^{s,1} + \Delta_{C,E}\varepsilon_k^{s,1}, \\ \Delta_{C,E}\rho_k^{s,2} = \Delta_{C,E}R_k^s + \left(\frac{\lambda^{s,2}}{\lambda^{s,1}}\right)^2 \Delta_{A,E}I_k^s + \Delta_{C,E}M_k^{s,2} + \\ \qquad \Delta_{C,E}\varepsilon_k^{s,2}, \\ \Delta_{C,E}\varphi_k^{s,1} = \frac{1}{\lambda^{s,1}}\Delta_{C,E}R_k^s - \frac{1}{\lambda^{s,1}}\Delta_{A,E}I_k^s + \Delta_{A,E}N^{s,1} + \\ \qquad \Delta_{C,A}N^{s,1} + \Delta_{C,E}m_k^{s,1} + \Delta_{C,E}\xi_k^{s,1}, \\ \Delta_{C,E}\varphi_k^{s,2} = \frac{1}{\lambda^{s,2}}\Delta_{C,E}R_k^s - \frac{\lambda^{s,2}}{(\lambda^{s,1})^2}\Delta_{A,E}I_k^s + \Delta_{A,E}N^{s,2} + \\ \qquad \Delta_{C,A}N^{s,2} + \Delta_{C,E}m_k^{s,2} + \Delta_{C,E}\xi_k^{s,2}. \end{cases} \quad (A2.6)$$

$$\begin{cases} \Delta_{D,E}\rho_k^{s,1} = \Delta_{D,E}R_k^s + \Delta_{A,E}I_k^s + \Delta_{D,E}M_k^{s,1} + \Delta_{D,E}\varepsilon_k^{s,1}, \\ \Delta_{D,E}\rho_k^{s,2} = \Delta_{D,E}R_k^s + \left(\frac{\lambda^{s,2}}{\lambda^{s,1}}\right)^2 \Delta_{A,E}I_k^s + \Delta_{D,E}M_k^{s,2} + \\ \qquad \Delta_{D,E}\varepsilon_k^{s,2}, \\ \Delta_{D,E}\varphi_k^{s,1} = \frac{1}{\lambda^{s,1}}\Delta_{D,E}R_k^s - \frac{1}{\lambda^{s,1}}\Delta_{A,E}I_k^s + \Delta_{A,E}N^{s,1} + \\ \qquad \Delta_{D,A}N^{s,1} + \Delta_{D,E}m_k^{s,1} + \Delta_{D,E}\xi_k^{s,1}, \\ \Delta_{D,E}\varphi_k^{s,2} = \frac{1}{\lambda^{s,2}}\Delta_{D,E}R_k^s - \frac{\lambda^{s,2}}{(\lambda^{s,1})^2}\Delta_{A,E}I_k^s + \Delta_{A,E}N^{s,2} + \\ \qquad \Delta_{D,A}N^{s,2} + \Delta_{D,E}m_k^{s,2} + \Delta_{D,E}\xi_k^{s,2}. \end{cases} \quad (A2.7)$$

In this Appendix we assumed that carrier phase ambiguities for short "auxiliary internal" (within the rover antenna) baselines (B, A), (C, A), (D, A) are much easier to resolve than the ambiguities for "external" (between rover and base) baselines (B, E), (C, E), (D, E). Also we assumed that first difference ionosphere delays $\Delta_{B,A}I_k^{s,b}$, $\Delta_{C,A}I_k^{s,b}$, and $\Delta_{D,A}I_k^{s,b}$ are negligible. Taking into account these two assumptions, we expressed the set of first difference raw measurements taken for baselines (A, E), (B, E), (C, E), (D, E) as a "quadruplicate" set of first difference raw measurements (A2.4)-(A2.7) with respect to the carrier phase ambiguity $\Delta_{A,E}N^{s,b}$ and residual ionosphere delay $\Delta_{A,E}I_k^s$ of only one "master" baseline (A,E).]

APPENDIX 3

Reduction of Measurements from Multiple Antennas to "Master" Antenna

Consider now pseudo-range terms $\Delta_{A,E}R_k^s$, $\Delta_{B,E}R_k^s$, $\Delta_{C,E}R_k^s$, $\Delta_{D,E}R_k^s$ in the equations (A2.4)-(A2.7) respectively. Let:

$X_{A,k}$ be position of the antenna A at the time instant k expressed in the ECEF frame; positions $X_{B,k}$, $X_{C,k}$, $X_{D,k}$, $X_{E,k}$ are defined equivalently;

$X_k^s$ be position of the satellite s at the time instant k expressed in the ECEF frame, corrected for the signal travel time;

$\|\cdot\|$ denote the Euclidian vector norm;

$\Delta_{A_1,A_2}t_k$ be the clock shift between receivers $A_1$ and $A_2$;

c be the light speed;

$S_{A,k}^s$ be the line-of-sight unit vector (expressed in the ECEF frame) from the position $X_{A,k}$ to the satellite position $X_k^s$;

$$S_{A,k}^s = \frac{1}{\|X_{A,k} - X_k^s\|}(X_{A,k} - X_k^s)$$

$\langle X, Y \rangle$ denote scalar product of two vectors X and Y; Then $\Delta_{A,E}R_k^s = \|X_{A,k} - X_k^s\| - \|X_{E,k} - X_k^s\| + c\Delta_{A,E}t_k$, $\Delta_{B,E}R_k^s = \|X_{B,k} - X_k^s\| - \|X_{E,k} - X_k^s\| + c\Delta_{B,E}t_k$, $\Delta_{C,E}R_k^s = \|X_{C,k} - X_k^s\| - \|X_{E,k} - X_k^s\| + c\Delta_{C,E}t_k$, $\Delta_{D,E}R_k^s = \|X_{D,k} - X_k^s\| - \|X_{E,k} - X_k^s\| + c\Delta_{D,E}t_k$. (A3.1)

Reserving the first order term of the Taylor-series expansion of the value $\|X_{B,k} - X_k^s\|$ we have $$\|X_{B,k} - X_k^s\| \approx \|X_{A,k} - X_k^s\| + \frac{1}{\|X_{A,k} - X_k^s\|}\langle X_{A,k} - X_k^s, X_{B,k} - X_{A,k}\rangle \quad (A3.2)$$

$$= \|X_{A,k} - X_k^s\| + \langle S_{A,k}^s, X_{B,k} - X_{A,k}\rangle.$$

Equivalently, $\|X_{C,k} - X_k^s\| \approx \|X_{A,k} - X_k^s\| + \langle S_{A,k}^s, X_{C,k} - X_{A,k}\rangle$ (A3.3)

and $\|X_{D,k} - X_k^s\| \approx \|X_{A,k} - X_k^s\| + \langle S_{A,k}^s, X_{D,k} - X_{A,k}\rangle$ (A3.4)

Note also that $\Delta_{B,E}t_k = \Delta_{A,E}t_k + \Delta_{B,A}t_k$, $\Delta_{C,E}t_k = \Delta_{A,E}t_k + \Delta_{C,A}t_k$, $\Delta_{D,E}t_k = \Delta_{A,E}t_k + \Delta_{D,A}t_k$. (A3.5)

We now define the local Cartesian "body frame" connected to the four antennas. Without loss of generality, we place its origin at the position of the "master" antenna A. The coordinates of "internal" baseline vectors (B, A), (C, A), (D, A) in the body frame are precisely known (a reasonable real-world assumption). Assume that a separate orientation unit (e.g., attitude determination unit), such as an inertial measurement unit or a processor implementing an estimation scheme (described above) provides the orientation orthogonal matrix of the four antennas body with respect to the ECEF frame at the time instant k. Let:

$Q_k$ be 3×3 orthogonal matrix of rotation from the body frame connected to the four antennas to ECEF; $Q_k^T Q_k = Q_k Q_k^T = 1$, where $^T$ stands for the matrix transpose and $$I = \begin{pmatrix} 1 & 0 & 0 \\ 0 & 1 & 0 \\ 0 & 0 & 1 \end{pmatrix}$$

denotes an identity matrix;

$L_{BA}$, $L_{CA}$, $L_{DA}$ are baseline vectors (B, A), (C, A), (D, A) expressed in the body frame so that $X_{B,k} - X_{A,k} = Q_k L_{BA}$, $X_{C,k} - X_{A,k} = Q_k L_{CA}$, $X_{D,k} - X_{A,k} = Q_k L_{DA}$, (A3.6)

Now taking into account (A3.1)-(A3.5) we arrive at the expressions $\Delta_{B,E}R_k^s = \Delta_{A,E}R_k^s + \langle S_{A,k}^s, Q_k L_{BA} \rangle + c\Delta_{B,A}t_k$, (A3.7)

$\Delta_{C,E}R_k^s = \Delta_{A,E}R_k^s + \langle S_{A,k}^s, Q_k L_{CA} \rangle + c\Delta_{C,A}t_k$, (A3.8)

$\Delta_{D,E}R_k^s = \Delta_{A,E}R_k^s + \langle S_{A,k}^s, Q_k L_{DA} \rangle + c\Delta_{D,A}t_k$. (A3.9)

Substitution of (A3.7)-(A3.9) to (A2.5)-(A2.7) respectively makes:

$$\begin{cases} \Delta_{B,E}\rho_k^{s,1} = \Delta_{A,E}R_k^s + \langle S_{A,k}^s, Q_k L_{BA}\rangle + c\Delta_{B,A}t_k + \\ \qquad \Delta_{A,E}I_k^s + \Delta_{B,E}M_k^{s,1} + \Delta_{B,E}\varepsilon_k^{s,1}, \\ \Delta_{B,E}\rho_k^{s,2} = \Delta_{A,E}R_k^s + \langle S_{A,k}^s, Q_k L_{BA}\rangle + c\Delta_{B,A}t_k + \\ \qquad \left(\frac{\lambda^{s,2}}{\lambda^{s,1}}\right)^2 \Delta_{A,E}I_k^s + \Delta_{B,E}M_k^{s,2} + \Delta_{B,E}\varepsilon_k^{s,2}, \\ \Delta_{B,E}\varphi_k^{s,1} = \frac{1}{\lambda^{s,1}}(\Delta_{A,E}R_k^s + \langle S_{A,k}^s, Q_k L_{BA}\rangle) + \frac{c}{\lambda^{s,1}}\Delta_{B,A}t_k - \\ \qquad \frac{1}{\lambda^{s,1}}\Delta_{A,E}I_k^s + \Delta_{A,E}N^{s,1} + \Delta_{B,A}N^{s,1} + \\ \qquad \Delta_{B,E}m_k^{s,1} + \Delta_{B,E}\xi_k^{s,1}, \\ \Delta_{B,E}\varphi_k^{s,2} = \frac{1}{\lambda^{s,2}}(\Delta_{A,E}R_k^s\langle S_{A,k}^s, Q_k L_{BA}\rangle) + \frac{c}{\lambda^{s,2}}\Delta_{B,A}t_k - \\ \qquad \frac{\lambda^{s,2}}{(\lambda^{s,1})^2}\Delta_{A,E}I_k^s + \Delta_{A,E}N^{s,2} + \Delta_{B,A}N^{s,2} + \\ \qquad \Delta_{B,E}m_k^{s,2} + \Delta_{B,E}\xi_k^{s,2}, \end{cases} \quad (A3.10)$$

-continued $$\begin{cases}
\Delta_{C,E}\rho_k^{s,1} = \Delta_{A,E}R_k^s + \langle S_{A,k}^s, Q_k L_{CA}\rangle + c\Delta_{C,A}t_k + \\
\quad \Delta_{A,E}I_k^s + \Delta_{C,E}M_k^{s,1} + \Delta_{C,E}\varepsilon_k^{s,1}, \\
\Delta_{C,E}\rho_k^{s,2} = \Delta_{A,E}R_k^s + \langle S_{A,k}^s, Q_k L_{CA}\rangle + c\Delta_{C,A}t_k + \\
\quad \left(\frac{\lambda^{s,2}}{\lambda^{s,1}}\right)^2 \Delta_{A,E}I_k^s + \Delta_{C,E}M_k^{s,2} + \Delta_{C,E}\varepsilon_k^{s,2}, \\
\Delta_{C,E}\varphi_k^{s,1} = \frac{1}{\lambda^{s,1}}(\Delta_{A,E}R_k^s + \langle S_{A,k}^s, Q_k L_{CA}\rangle) + \frac{c}{\lambda^{s,1}}\Delta_{B,A}t_k - \\
\quad \frac{1}{\lambda^{s,1}}\Delta_{A,E}I_k^s + \Delta_{A,E}N^{s,1} + \Delta_{C,A}N^{s,1} + \\
\quad \Delta_{C,E}m_k^{s,1} + \Delta_{C,E}\xi_k^{s,1}, \\
\Delta_{C,E}\varphi_k^{s,2} = \frac{1}{\lambda^{s,2}}(\Delta_{A,E}R_k^s + \langle S_{A,k}^s, Q_k L_{CA}\rangle) + \frac{c}{\lambda^{s,2}}\Delta_{B,A}t_k - \\
\quad \frac{\lambda^{s,2}}{(\lambda^{s,1})^2}\Delta_{A,E}I_k^s + \Delta_{A,E}N^{s,2} + \Delta_{C,A}N^{s,2} + \\
\quad \Delta_{C,E}m_k^{s,2} + \Delta_{C,E}\xi_k^{s,2},
\end{cases}$$ (A3.11)

$$\begin{cases}
\Delta_{D,E}\rho_k^{s,1} = \Delta_{A,E}R_k^s + \langle S_{A,k}^s, Q_k L_{DA}\rangle + c\Delta_{D,A}t_k + \\
\quad \Delta_{A,E}I_k^s + \Delta_{D,E}M_k^{s,1} + \Delta_{D,E}\varepsilon_k^{s,1}, \\
\Delta_{D,E}\rho_k^{s,2} = \Delta_{A,E}R_k^s + \langle S_{A,k}^s, Q_k L_{DA}\rangle + c\Delta_{D,A}t_k + \\
\quad \left(\frac{\lambda^{s,2}}{\lambda^{s,1}}\right)^2 \Delta_{A,E}I_k^s + \Delta_{D,E}M_k^{s,2} + \Delta_{D,E}\varepsilon_k^{s,2}, \\
\Delta_{D,E}\varphi_k^{s,1} = \frac{1}{\lambda^{s,1}}(\Delta_{A,E}R_k^s + \langle S_{A,k}^s, Q_k L_{DA}\rangle) + \frac{c}{\lambda^{s,1}}\Delta_{D,A}t_k - \\
\quad \frac{1}{\lambda^{s,1}}\Delta_{A,E}I_k^s + \Delta_{A,E}N^{s,1} + \Delta_{D,A}N^{s,1} + \\
\quad \Delta_{D,E}m_k^{s,1} + \Delta_{D,E}\xi_k^{s,1}, \\
\Delta_{D,E}\varphi_k^{s,2} = \frac{1}{\lambda^{s,2}}(\Delta_{A,E}R_k^s + \langle S_{A,k}^s, Q_k L_{DA}\rangle) + \frac{c}{\lambda^{s,2}}\Delta_{D,A}t_k - \\
\quad \frac{\lambda^{s,2}}{(\lambda^{s,1})^2}\Delta_{A,E}I_k^s + \Delta_{A,E}N^{s,2} + \Delta_{D,A}N^{s,2} + \\
\quad \Delta_{D,E}m_k^{s,2} + \Delta_{D,E}\xi_k^{s,2}.
\end{cases}$$ (A3.12)

In this Appendix, in addition to earlier assumptions (see Appendix 2), we assumed that an attitude determination unit supplies the attitude orientation matrix $Q_k$ every time instant k. Taking into account these assumptions we expressed the set of first difference raw measurements taken for baselines (A, E), (B, E), (C, E), (D, E) as a "quadruplicate" set of first difference raw measurements (A2.4)-(A2.7) with respect to the carrier phase ambiguity $\Delta_{A,E}N^{s,b}$, residual ionosphere delay $\Delta_{A,E}I_k^s$, and first difference range $\Delta_{A,E}R_k^s$ of only one "master" baseline (A,E).

APPENDIX 4

Reduction of Measurements from Multiple Antennas to "Master" Antenna: "Quadruplicate" Set of Linearized Measurement Equations Let us now proceed with the linearized first difference measurement system often used in the formulation of numerical schemes based on the Gauss-Newton iterations. We are looking for the position of the master antenna $X_{A,k}$ together with the clock $c\Delta_{A,E}t_k$ shift between receivers A and E, first difference residual ionosphere delay $\Delta_{A,E}I_k^s$, and carrier phase ambiguity $\Delta_{A,E}N^{s,1}$, $\Delta_{A,E}N^{s,2}$. Starting with the rough approximation $X_{A,k}^0$ we proceed with calculation of the correction $\delta X_{A,k}$ so that $$X_{A,k} = X_{A,k}^0 + \delta X_{A,k}$$ (A4.1)

The Taylor series expansion of $\Delta_{A,E}R_k^s$ in the neighborhood of the point $X_{A,k}^0$ and reserving the first linear term results in $$\Delta_{A,E}R_k^s = \|X_{A,k} - X_k^s\| - \|X_{E,k} - X_k^s\| + c\Delta_{A,E}t_k$$ (A4.2)

$$\approx \|X_{A,k}^0 - X_k^s\| - \|X_{E,k} - X_k^s\| + c\Delta_{A,E}t_k + \langle S_{A,k}^s, \delta X_{A,k}\rangle.$$

We now introduce more convenient notations necessary to present the linearized equations in matrix form. Let:

n be the number of observable satellites; suppose for the sake of simplicity that this number does not change in time;

$Y_k$ be the 4×1 vector composed of three-dimensional corrections $\delta X_{A,k}$ to the rough position (according to (A4.11) and clock offset $c\Delta_{A,E}t_k$:

$$Y_k = \begin{pmatrix} Y_{k,1} \\ Y_{k,2} \\ Y_{k,3} \\ Y_{k,4} \end{pmatrix} = \begin{pmatrix} \delta X_{A,k} \\ c\Delta_{A,E}t_k \end{pmatrix}$$ (A4.3)

$J_k$ be the n×4 Jacobian matrix composed of partial derivatives of first difference pseudoranges with respect to variables $Y_k$; rows of the matrix correspond to satellites, columns correspond to variables; (s, j) entry (where S=1, . . . , n, j=1, 2, 3, 4) is denoted as $J_{k,j}^s$:

$$J_{k,j}^s = \frac{\partial \Delta_{A,E}R_k^s}{\partial Y_{k,j}}, j = 1, 2, 3, J_{k,4}^s = \frac{\partial \Delta_{A,E}R_k^s}{\partial Y_{k,4}} = 1;$$ (A4.4)

in fact, first three entries of the row s coincide with components of the line of sight vector $S_{A,k}^s$;

$\rho_{A,k}^1$ be the n×1 vector of first difference (A, E) pseudorange $\Delta_{A,E}\rho_k^{s,1}$ measured in the frequency band L1; with $\rho_{B,k}^1$, $\rho_{C,k}^1$, $\rho_{D,k}^1$ having corresponding meanings for baselines (B,E), (C,E) and (D,E), respectively;

$\rho_{A,k}^2$ be the n×1 vector of first difference (A, E) pseudorange $\Delta_{A,E}\rho_k^{s,2}$ measured in the frequency band L2; with $\rho_{B,k}^2$, $\rho_{C,k}^2$, $\rho_{D,k}^2$ having corresponding meanings for baselines (B,E), (C,E) and (D,E), respectively;

$\phi_{A,k}^1$ be the n×1 vector of first difference (A, E) carrier phase $\Delta_{A,E}\phi_k^{s,1}$ measured in the frequency band L1; with $\phi_{B,k}^1$, $\phi_{C,k}^1$, $\phi_{D,k}^1$ having corresponding meanings for baselines (B,E), (C,E) and (D,E), respectively;

$\phi_{A,k}^2$ be the n×1 vector of first difference (A, E) carrier phase $\Delta_{A,E}\phi_k^{s,2}$ measured in the frequency band L2; with $\phi_{B,k}^2$, $\phi_{C,k}^2$, $\phi_{D,k}^2$ having corresponding meanings for baselines (B,E), (C,E) and (D,E), respectively;

$r_{A,k}$ be the n×1 vector of first difference geometric ranges $\|X_{A,k}^0 - X_k^s\| - \|X_{E,k} - X_k^s\|$, calculated at the point of rough approximation $X_{A,k}^k$;

$M_{A,k}^1$, $M_{A,k}^2$, $m_{A,k}^1$, $m_{A,k}^2$, $\epsilon_{A,k}^1$, $\epsilon_{A,k}^2$, $\xi_{A,k}^1$, $\xi_{A,k}^2$ be vectors of multipath and noise components, as they appear in the equations (A2.4); the same way are defined $M_{B,k}^1$, $M_{B,k}^2$, $m_{B,k}^1$, $m_{B,k}^2$, $\epsilon_{B,k}^1$, $\epsilon_{B,k}^2$, $\xi_{B,k}^1$, $\xi_{B,k}^2$;

$M_{C,k}^1$, $M_{C,k}^2$, $m_{C,k}^1$, $m_{C,k}^2$, $\epsilon_{C,k}^1$, $\epsilon_{C,k}^2$, $\xi_{C,k}^1$, $\xi_{C,k}^2$;

$M_{D,k}^1$, $M_{D,k}^2$, $m_{D,k}^1$, $m_{D,k}^2$, $\epsilon_{D,k}^1$, $\epsilon_{D,k}^2$, $\xi_{D,k}^1$, $\xi_{D,k}^2$.

$I_k$ be the n×1 vector of first difference (A, E) delay $\Delta_{A,E}I_k^s$;

$\Gamma_\lambda^1$ and $\Gamma_\lambda^2$ be diagonal matrices defined as $$\Gamma_\lambda^1 = \begin{pmatrix} \frac{1}{\lambda^{1,1}} & 0 & \cdots & 0 \\ 0 & \frac{1}{\lambda^{2,1}} & \cdots & 0 \\ \vdots & \vdots & \ddots & \vdots \\ 0 & 0 & \cdots & \frac{1}{\lambda^{n,1}} \end{pmatrix},$$

$$\Gamma_\lambda^2 = \begin{pmatrix} \frac{1}{\lambda^{1,2}} & 0 & \cdots & 0 \\ 0 & \frac{1}{\lambda^{2,2}} & \cdots & 0 \\ \vdots & \vdots & \ddots & \vdots \\ 0 & 0 & \cdots & \frac{1}{\lambda^{n,2}} \end{pmatrix};$$

$\Gamma$ be diagonal matrix composed of $$\left(\frac{\lambda^{s,2}}{\lambda^{s,1}}\right)^2,$$

$s=1, \ldots, n$:

$$\Gamma = \begin{pmatrix} \left(\frac{\lambda^{1,2}}{\lambda^{1,1}}\right)^2 & 0 & \cdots & 0 \\ 0 & \left(\frac{\lambda^{2,2}}{\lambda^{2,1}}\right)^2 & \cdots & 0 \\ \vdots & \vdots & \ddots & \vdots \\ 0 & 0 & \cdots & \left(\frac{\lambda^{n,2}}{\lambda^{n,1}}\right)^2 \end{pmatrix} = (\Gamma_\lambda^1)^2 (\Gamma_\lambda^2)^{-2};$$

$N_A^1$ be the n×1 vector of first difference (A, E) L1 ambiguity $\Delta_{A,E} N^{s,1}$;

$N_A^2$ be the n×1 vector of first difference (A, E) L2 ambiguity $\Delta_{A,E} N^{s,2}$;

$e=(1, 1, \ldots 1)^T$ be the n×1 vector consisting of units.

Taking into account (A4.2) and notations defined above rewrite the set of equations (A2.4) as:

$$J_k Y_k + I_k = \rho_{A,k}^1 - r_{A,k} - M_k^1 - \epsilon_k^1.$$

Let us denote the right hand side (errors are not included) of the previous equation as $b_{A,k}^1 = \rho_{A,k}^1 - r_{A,k}$. Then last equation takes the form $$J_k Y_k + I_k = b_{A,k}^1 - M_k^1 - \epsilon_k^1.$$

Finally, the set of equations (A2.4) takes the form $$\begin{cases} J_k Y_k + I_k = b_{A,k}^1 - M_{A,k}^1 - \varepsilon_{A,k}^1, \\ J_k Y_k + \Gamma I_k = b_{A,k}^2 - M_{A,k}^2 - \varepsilon_{A,k}^2, \\ \Gamma_\lambda^1 J_k Y_k - \Gamma_\lambda^1 I_k + N^1 = c_{A,k}^1 - m_{A,k}^1 - \xi_{A,k}^1, \\ \Gamma_\lambda^2 J_k Y_k - \Gamma_\lambda^2 \Gamma I_k + N^2 = c_{A,k}^2 - m_{A,k}^2 - \xi_{A,k}^2, \end{cases} \quad (A4.5)$$

where $b_{A,k}^2 = \rho_{A,k}^2 - r_{A,k}$, $c_{A,k}^1 = \phi_{A,k}^1 - \Gamma_\lambda^1 r_{A,k} c_{A,k}^2 = \phi_{A,k}^2 - \Gamma_\lambda^2 r_{A,k}$. Proceeding the same way, we rewrite the set of equations (A3.10) (related to the antenna B) in linearized form with respect to the variables $Y_k$, $I_k$, $N^1$, $N^2$ (related to the antenna A) as:

$$\begin{cases} J_k Y_k + I_k = b_{B,k}^1 - M_{B,k}^1 - \varepsilon_{B,k}^1, \\ J_k Y_k + \Gamma I_k = b_{B,k}^2 - M_{B,k}^2 - \varepsilon_{B,k}^2, \\ \Gamma_\lambda^1 J_k Y_k - \Gamma_\lambda^1 I_k + N^1 = c_{B,k}^1 - m_{B,k}^1 - \xi_{B,k}^1, \\ \Gamma_\lambda^2 J_k Y_k - \Gamma_\lambda^2 \Gamma I_k + N^2 = c_{B,k}^2 - m_{B,k}^2 - \xi_{B,k}^2, \end{cases} \quad (A4.6)$$

where:

$b_{B,k}^1 = \rho_{B,k}^1 - r_{A,k} - J_k Q_k L_{BA} - c\Delta_{B,A} t_k e$, $b_{B,k}^2 = \rho_{B,k}^2 - r_{A,k} - J_k Q_k L_{BA} - c\Delta_{B,A} t_k e$, $c_{B,k}^1 = \phi_{B,k}^1 - \Gamma_\lambda^1 (r_{A,k} + J_k Q_k L_{BA} + c\Delta_{B,A} t_k e)$, $c_{B,k}^2 = \phi_{B,k}^2 - \Gamma_\lambda^2 (r_{A,k} + J_k Q_k L_{BA} + c\Delta_{B,A} t_k e)$, Sets of equations (A3.11) and (A3.12) are rewritten the same way as:

$$\begin{cases} J_k Y_k + I_k = b_{C,k}^1 - M_{C,k}^1 - \varepsilon_{C,k}^1, \\ J_k Y_k + \Gamma I_k = b_{C,k}^2 - M_{C,k}^2 - \varepsilon_{C,k}^2, \\ \Gamma_\lambda^1 J_k Y_k - \Gamma_\lambda^1 I_k + N^1 = c_{C,k}^1 - m_{C,k}^1 - \xi_{C,k}^1, \\ \Gamma_\lambda^2 J_k Y_k - \Gamma_\lambda^2 \Gamma I_k + N^2 = c_{C,k}^2 - m_{C,k}^2 - \xi_{C,k}^2, \end{cases} \quad (A4.7)$$

$$\begin{cases} J_k Y_k + I_k = b_{D,k}^1 - M_{D,k}^1 - \varepsilon_{D,k}^1, \\ J_k Y_k + \Gamma I_k = b_{D,k}^2 - M_{D,k}^2 - \varepsilon_{D,k}^2, \\ \Gamma_\lambda^1 J_k Y_k - \Gamma_\lambda^1 I_k + N^1 = c_{D,k}^1 - m_{D,k}^1 - \xi_{D,k}^1, \\ \Gamma_\lambda^2 J_k Y_k - \Gamma_\lambda^2 \Gamma I_k + N^2 = c_{D,k}^2 - m_{D,k}^2 - \xi_{D,k}^2, \end{cases} \quad (A4.8)$$

where:

$b_{C,k}^1 = \rho_{C,k}^1 - r_{A,k} - J_k Q_k L_{CA} - c\Delta_{C,A} t_k e$, $b_{C,k}^2 = \rho_{C,k}^2 - r_{A,k} - J_k Q_k L_{CA} - c\Delta_{C,A} t_k e$, $c_{C,k}^1 = \phi_{C,k}^1 - \Gamma_\lambda^1 (r_{A,k} + J_k Q_k L_{CA} + c\Delta_{C,A} t_k e)$, $c_{C,k}^2 = \phi_{C,k}^2 - \Gamma_\lambda^2 (r_{A,k} + J_k Q_k L_{CA} + c\Delta_{C,A} t_k e)$, $b_{D,k}^1 = \rho_{D,k}^1 - r_{A,k} - J_k Q_k L_{DA} - c\Delta_{D,A} t_k e$, $b_{D,k}^2 = \rho_{D,k}^2 - r_{A,k} - J_k Q_k L_{DA} - c\Delta_{D,A} t_k e$, $c_{D,k}^1 = \phi_{D,k}^1 - \Gamma_\lambda^1 (r_{A,k} + J_k Q_k L_{DA} + c\Delta_{D,A} t_k e)$, $c_{D,k}^2 = \phi_{D,k}^2 - \Gamma_\lambda^2 (r_{A,k} + J_k Q_k L_{DA} + c\Delta_{D,A} t_k e)$, Note that all four systems of equations (A4.5), (A4.6), (A4.7), (A4.8) have the same left hand side and differ only in their right hand sides. In other words, the four systems have the same structure of variables to be estimated and differ only in measurements (or initial/raw data) presented on the right hand side. A direct consequence of this is that the four systems of measurement equations (A2.4)-(A2.7) totally coincide under assumptions made in Appendices 2 and 3 and assuming the absence of multipath and noise errors ($M_{A_i,k}^b$, $m_{A_i,k}^b$, $\epsilon_{A_i,k}^b$) and errors in estimation of orientation ($Q_k$).

In this Appendix we expressed the set of linearized first difference raw measurements taken for baselines (A, E), (B, E), (C, E), (D, E) as a "quadruplicate" set of equations (A4.5), (A4.6), (A4.7), (A4.8) with respect to the carrier phase ambiguity $N_A^1$, $N_A^2$, residual ionosphere delay $I_k$, and corrections vector $$Y_k = \begin{pmatrix} \delta X_{A,k} \\ c\Delta_{A,E} t_k \end{pmatrix},$$

all associated with only one "master" baseline (A,E). The "quadruplicate" set of equations is considered as a redundant set of equations for determination of $N_A^1$, $N_A^2$, $I_k$, $Y_k$. Not all measurements may be available simultaneously. Raw measurements from any of antennas A, B, C, or D can be temporary unavailable. Data from only one rover antenna is necessary, thus enabling position determination even under shading conditions. All other data is considered redundant, and can be used to check for accuracy/consistency.

APPENDIX 5

Figure 6:
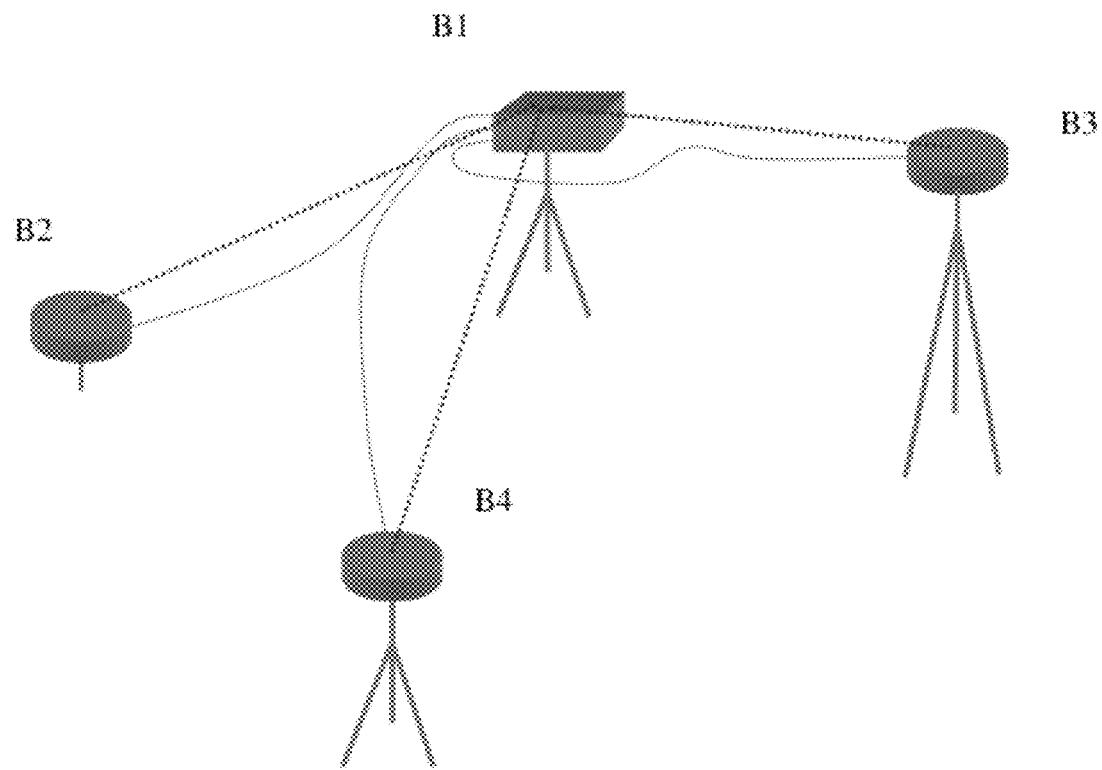
FIG. 6 illustrates a base-side four-antenna assembly according to embodiments of the invention.

Reduction of Quadruplicate Set of Measurements at the Base Side to Single Set of Measurements Appendices 3 and 4 describe how to process data received from four rover antennas A, B, C, D and a single base antenna E to estimate position of the "master" rover antenna A. In this Appendix we describe how to convert data from four base antennas $B_1$, $B_2$, $B_3$, $B_4$ (as shown in FIG. 6) to the data from only one "effective" base.

One objective of installing four antennas on the base side is to better average multipath.

Using considerations similar to those described in the Appendix 3, resolve ambiguity between antennas $\Delta_{B_2,B_1} N^{s,b}$, $\Delta_{B_3,B_1} N^{s,b}$, $\Delta_{B_4,B_1} N^{s,b}$ and reduce carrier phase measurements of three antennas $B_2$, $B_3$, $B_4$ to the same ambiguity level as the antenna $B_1$ has:

$$\tilde{\phi}_k^{s,b}{}_{B_1} = \phi_k^{s,b}{}_{B_1},$$

$$\tilde{\phi}_k^{s,b}{}_{B_2} = \phi_k^{s,b}{}_{B_2} + \Delta_{B_2,B_1} N^{s,b},$$

$$\tilde{\phi}_k^{s,b}{}_{B_3} = \phi_k^{s,b}{}_{B_3} + \Delta_{B_3,B_1} N^{s,b},$$

$$\tilde{\phi}_k^{s,b}{}_{B_4} = \phi_k^{s,b}{}_{B_4} + \Delta_{B_4,B_1} N^{s,b}.$$

Then residuals of raw measurements are calculated:

$$\Pi_{kB_i}^{s,b} = \rho_{kB_i}^{s,b} - R_{kB_i}^s, \quad (A5.2)$$

$$\Phi_{kB_i}^{s,b} = \varphi_{kB_i}^{s,b} - \frac{1}{\lambda^{s,b}} R_{kB_i}^s,$$

and averaged corrections are calculated:

$$\Pi_k^{s,b} = \frac{1}{4} \sum_{i=1}^{4} \Pi_{kB_i}^{s,b}, \quad (A5.3)$$

$$\Phi_k^{s,b} = \frac{1}{4} \sum_{i=1}^{4} \Phi_{kB_i}^{s,b}.$$

and transmitted via RTCM 20,21 messages in the conventional manner ("RTCM" refers to the Radio Technical Commission for Maritime Services.)

There are many formats used for base data transmission to the rover side. The most well known and commonly used formats are RTCM and CMR. When using RTCM 2.1-2.3 sets of real time messages there are two possibilities: (a) transmit full raw measurements using, for example messages RTCM 18 and 19 for carrier phase and pseudoranges respectively, (b) transmit so called residuals using messages RTCM 20 and 21. In this last case quantities $\Pi_k^{s,b}{}_{B_i}$, $\Phi_k^{s,b}{}_{B_i}$ (see (A5.2) are calculated as a difference between raw measurements and the geometric range between the base position and the satellite, both perfectly known. In the usual single antenna setup, the set of residuals (called also "corrections") for all satellites is transmitted every epoch from the base to the rover through UHF or GSM radio link using RTCM 20 and 21 messages. For multi-antenna setup we propose first to calculate the set of residuals for every base according to (A5.2). Then residuals are averaged for every satellite according to (A5.3). Averaging filters out non-correlated part of the multipath errors $M_k^{s,b}{}_{B_i}$ and $m_k^{s,b}{}_{B_i}$ affecting the same satellites tracked by four antennas, see (A1.1). Then averaged data can be considered as data collected by a kind of "effective" base and transmitted through the data link to the rover the conventional way. Note that raw data $\rho_k^{s,b}{}_{B_i}$, $\phi_k^{s,b}{}_{B_i}$ can not be averaged as they are related to different positions of base antennas, while residuals can be averaged, as antenna positions are compensated according to (A5.2).

What is claimed is:

1. A navigation apparatus comprising:
   a rover receiver including at least two rover antennas;
   an orientation unit for determining orientation of the at least two rover antennas; and
   rover processing logic for determining a first position of the rover receiver based upon the orientation and the position of at the least two rover antennas with respect to at least two base antennas of a base transceiver.

2. The navigation apparatus of claim 1, wherein the base transceiver includes:
   at least two base antennas; and
   base processing logic having access to the positions of the at least two base antennas.

3. The navigation apparatus of claim 2, wherein the positions of the at least two base antennas are referenced to an earth-centered reference frame.

4. The navigation apparatus of claim 2, wherein the base processing logic is operable to determine a positional correction of the at least two base antennas.

5. The navigation apparatus of claim 4, wherein the base transceiver is operable to transmit to the rover receiver the positional correction.

6. The navigation apparatus of claim 2, wherein the base processing logic is operable to determine an average positional correction with respect to the at least two base antennas.

7. The navigation apparatus of claim 6, wherein the base transceiver is operable to transmit to the rover receiver the average positional correction.

8. The navigation apparatus of claim 7, wherein
   the rover processing logic is operable to determine a second position of the rover receiver based upon navigational signals received from navigational satellites, and to correct the second position of the rover receiver using the average positional correction.

9. The navigation apparatus of claim 2, wherein the positions of the at least two base antennas accessed by the base processing logic is derived from an orientation of the at least two base antennas provided by an orientation unit.

10. The navigation apparatus of claim 1, wherein
    the base transceiver is operable to transmit to the rover receiver a redundant set of baseline measurements, and the receiver processing logic is operable to compare a second position of the rover receiver determined from one baseline measurement of the redundant set to at least one third position of the rover receiver determined from another baseline measurement of the redundant set to thereby check for consistency.

11. The navigation apparatus of claim 10, wherein the at least two rover antennas include four rover antennas, the at least two base antennas include four base antennas, and the redundant set of baselines includes 16 baselines.

12. A computer-implemented method for determining position of a rover receiver, wherein the rover receiver includes at least two rover antennas, the method comprising:
   determining orientation of the at least two rover antennas; and
   determining a first position of the rover receiver based upon the orientation and the position of the at least two rover antennas with respect to at least two base antennas of a base transceiver.

13. The method of claim 12, wherein the base transceiver includes:
   at least two base antennas; and
   base processing logic having access to the positions of the at least two base antennas.

14. The method of claim 13, comprising determining a positional correction of the at least two base antennas.

15. The method of claim 14, comprising transmitting to the rover receiver the positional correction.

16. The method of claim 13, comprising determining an average positional correction with respect to the at least two base antennas.

17. The method of claim 16, comprising transmitting to the rover receiver the average positional correction.

18. The method of claim 17, comprising:
   determining a second position of the rover receiver based upon navigational signals received from navigational satellites; and
   correcting the second position of the rover receiver using the average positional correction.

19. The method of claim 13, wherein the positions of the at least two base antennas accessed by the base processing logic are derived from an orientation of the at least two base antennas provided by an orientation unit.

20. The method of claim 12, comprising:
   transmitting to the rover receiver a redundant set of baseline measurements, and
   comparing a second position of the rover receiver determined from one baseline measurement of the redundant set to at least one third position of the rover receiver determined from another baseline measurement of the redundant set to thereby check for consistency.

21. A non-transitory computer readable medium comprising computer-executable instructions for determining position of a rover receiver, wherein the rover receiver includes at least two rover antennas, the instructions for:
   determining orientation of the at least two rover antennas; and
   determining a first position of the rover receiver based upon the orientation and the position of the at least two rover antennas with respect to at least two base antennas of a base transceiver.

22. The non-transitory computer-readable medium of claim 21, wherein the base transceiver includes:
   at least two base antennas; and
   base processing logic having access to the positions of the at least two base antennas.

23. The non-transitory computer-readable medium of claim 22, comprising instructions for determining a positional correction of the at least two base antennas.

24. The non-transitory computer-readable medium of claim 23, comprising instructions for transmitting to the rover receiver the positional correction.

25. The non-transitory computer-readable medium of claim 22, comprising instructions for determining an average positional correction with respect to the at least two base antennas.

26. The non-transitory computer-readable medium of claim 25, comprising instructions for transmitting to the rover receiver the average positional correction.

27. The non-transitory computer-readable medium of claim 26, comprising instructions for:
   determining a second position of the rover receiver based upon navigational signals received from navigational satellites; and
   correcting the second position of the rover receiver using the average positional correction.

28. The non-transitory computer-readable medium of claim 22, wherein the positions of the at least two base antennas accessed by the base processing logic are derived from an orientation of the at least two base antennas provided by an orientation unit.

29. The non-transitory computer-readable medium of claim 21, comprising instructions for:
   transmitting to the rover receiver a redundant set of baseline measurements, and comparing a second position of the rover receiver determined from one baseline measurement of the redundant set to at least one third position of the rover receiver determined from another baseline measurement of the redundant set to thereby check for consistency.

* * * * *